US008603342B2

United States Patent
Huang et al.

(10) Patent No.: US 8,603,342 B2
(45) Date of Patent: Dec. 10, 2013

(54) APPARATUS AND METHOD FOR COLLECTING SOLID MICROPARTICLES FLOATING IN WATER

(75) Inventors: Chun-Ping Huang, Taoyuan County (TW); Kuo-Yuan Chang, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 488 days.

(21) Appl. No.: 12/905,455

(22) Filed: Oct. 15, 2010

(65) Prior Publication Data

US 2012/0055882 A1    Mar. 8, 2012

(30) Foreign Application Priority Data

Sep. 3, 2010   (TW) .............................. 99129832 A

(51) Int. Cl.
*C02F 1/52* (2006.01)
*B03D 3/00* (2006.01)
*B01D 21/01* (2006.01)

(52) U.S. Cl.
USPC ............ 210/738; 210/723; 210/739; 210/800

(58) Field of Classification Search
USPC ......... 210/702–744, 767, 800, 803, 170, 265, 210/268, 269, 298, 513
See application file for complete search history.

(56) References Cited

U.S. PATENT DOCUMENTS

| | | | | | |
|---|---|---|---|---|---|
| 4,238,335 | A | * | 12/1980 | Grimsley | 210/802 |
| 5,122,266 | A | * | 6/1992 | Kent | 210/150 |
| 5,507,950 | A | * | 4/1996 | Senda et al. | 210/615 |
| 5,549,828 | A | * | 8/1996 | Ehrlich | 210/602 |
| 2010/0133199 | A1 | * | 6/2010 | Ochiai | 210/709 |
| 2011/0068062 | A1 | * | 3/2011 | McClelland | 210/741 |

* cited by examiner

*Primary Examiner* — Bobby Ramdhanie
*Assistant Examiner* — Nader Hossaini
(74) *Attorney, Agent, or Firm* — WPAT, PC; Justin King

(57) ABSTRACT

The present invention relates to an apparatus and method for collecting solid microparticles floating in water, and more particularly, to a safe, ease to use, and environmental friendly collecting apparatus and method adapted for collecting radioactive solid microparticles floating and depositing in a cooling water tank of nuclear facility or a tank for storing radioactive materials.

5 Claims, 2 Drawing Sheets

APPARATUS AND METHOD FOR COLLECTING SOLID MICROPARTICLES FLOATING IN WATER

BACKGROUND OF THE INVENTION

1. Field of Invention

The present invention relates to an apparatus and method for collecting solid microparticles floating in water, and more particularly, to a collecting apparatus and method adapted for collecting radioactive solid microparticles floating and depositing in a cooling water tank of nuclear facility or a tank for storing radioactive materials.

2. Related Art

Due to factors such as cleaning, cutting, and storing of various radioactive materials, radioactive solid microparticles may spread in a cooling or material-storage water tank of nuclear facility, such as suspended solid and sludge precipitated in the bottom of the water tank.

Conventionally, water is purified by filtering or other methods. Most methods are fixed on the ground instead of being under water, have poor mobility, and cannot be flexibly moved to different polluted areas for treatment. In addition, direct filtering of water in the tank may result in high-activity, heavily-polluted waste filter media, and reduce the service life of the water purification system.

SUMMARY OF THE INVENTION

In an embodiment, an apparatus for collecting solid microparticles floating in water is provided, which includes an upper bracket, an external container, a support frame, and a replaceable sludge can.

The upper bracket is a rectangular structure floatable on water.

The external container is fixed under the upper bracket, and a bottom of the external container is an inverted conical structure.

The support frame is located inside the external container. A top of the support frame is hung on the upper bracket, so as to enable the support frame to float on water. The support frame is in a structure of a cuboidal frame, and has at least one downward-sloping precipitation plate therein, and each precipitation plate has a plurality of downward-sloping fins.

The replaceable sludge can is disposed at an opening of the bottom of the external container. At a top of the replaceable sludge can is a hoisting ring tied with a hoisting sling. When being replaced, the replaceable sludge can is hoisted by using the hoisting sling, and then is replaced.

The opening is located at a center of the bottom of the external container, and has a suitable size for allowing the replaceable sludge can to pass through.

In another embodiment, a method for collecting solid microparticles floating in water is provided, which includes the following steps.

Preparatory step: an apparatus for collecting solid microparticles floating in water is provided, and the apparatus is placed in water.

Feeding step: a solution containing solid microparticles is continuously pumped into the apparatus for collecting solid microparticles floating in water until a full water level is reached.

Mixing step: a settling reagent is added into the solution in the apparatus for collecting solid microparticles floating in water, and the solution is stirred to make the settling reagent fully mixed with the solution.

Collecting step: the solution is set until the solid microparticles are precipitated into the replaceable sludge can, and the clean liquid obtained after precipitation is discharged, and sewage is continued to be pumped into the apparatus for collecting solid microparticles floating in water.

Replacing step: the replaceable sludge can is hoisted out and replaced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The technical means and effects adopted in the present invention to achieve the objectives are described below with reference to the accompanying drawings, and the embodiments illustrated in the following drawings are only used for illustration, so that the Examiner can understand the present invention, but the technical means of the present invention is not limited to the illustrated drawings.

Figure 1:
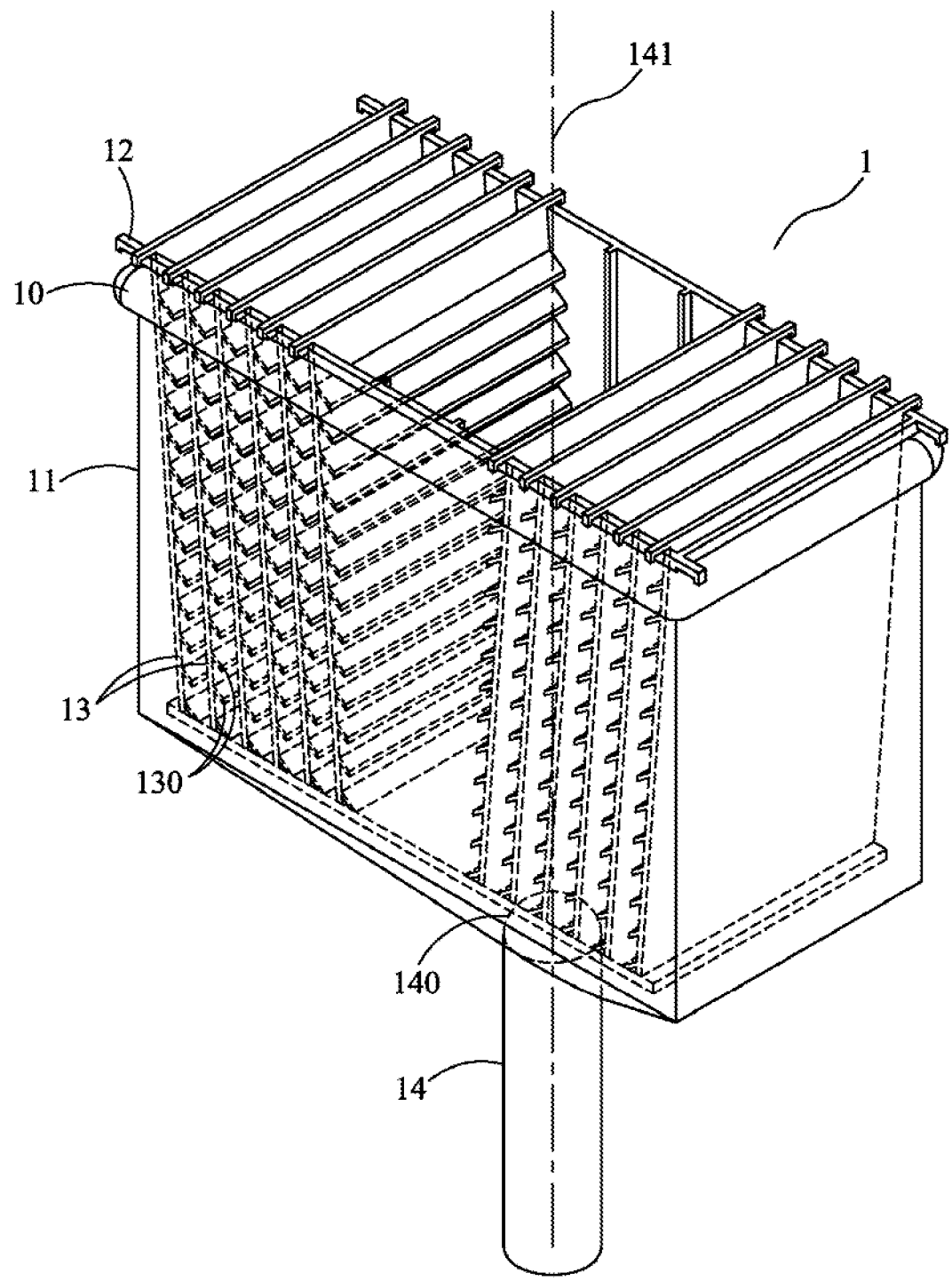
FIG. 1 is a schematic view of an apparatus for collecting solid microparticles floating in water.

Referring to FIG. 1, an apparatus 1 for collecting solid microparticles floating in water includes an upper bracket 10, an external container 11, a support frame 12, twelve detachable precipitation plates 13, and a replaceable sludge can 14.

The upper bracket 10 is a rectangular structure floatable on water which is formed by four hollow tubes.

The external container 11 is fixed under the upper bracket 10, a bottom of the external container 11 is an inverted conical structure, and an opening is formed at a center of the bottom.

The support frame 12 is in a structure of a cuboidal frame, and is located inside the external container 11. A top of the support frame 12 is hung on the upper bracket 10, so as to enable the support frame 12 to float on water.

The twelve detachable precipitation plates 13 are fixed inside the support frame 12 at a depression angle of 60 degrees. Each detachable precipitation plate 13 has a plurality of downward-sloping fins 130.

The replaceable sludge can 14 is disposed at the opening of the bottom of the external container 11. At a top of the replaceable sludge can 14 is a hoisting ring 140 tied with a hoisting sling 141. When replacement is required, the replaceable sludge can 14 is hoisted by using the hoisting sling 141, and then is replaced.

The opening of the bottom of the external container 11 has a suitable size for allowing the replaceable sludge can 14 to pass through.

Figure 2:
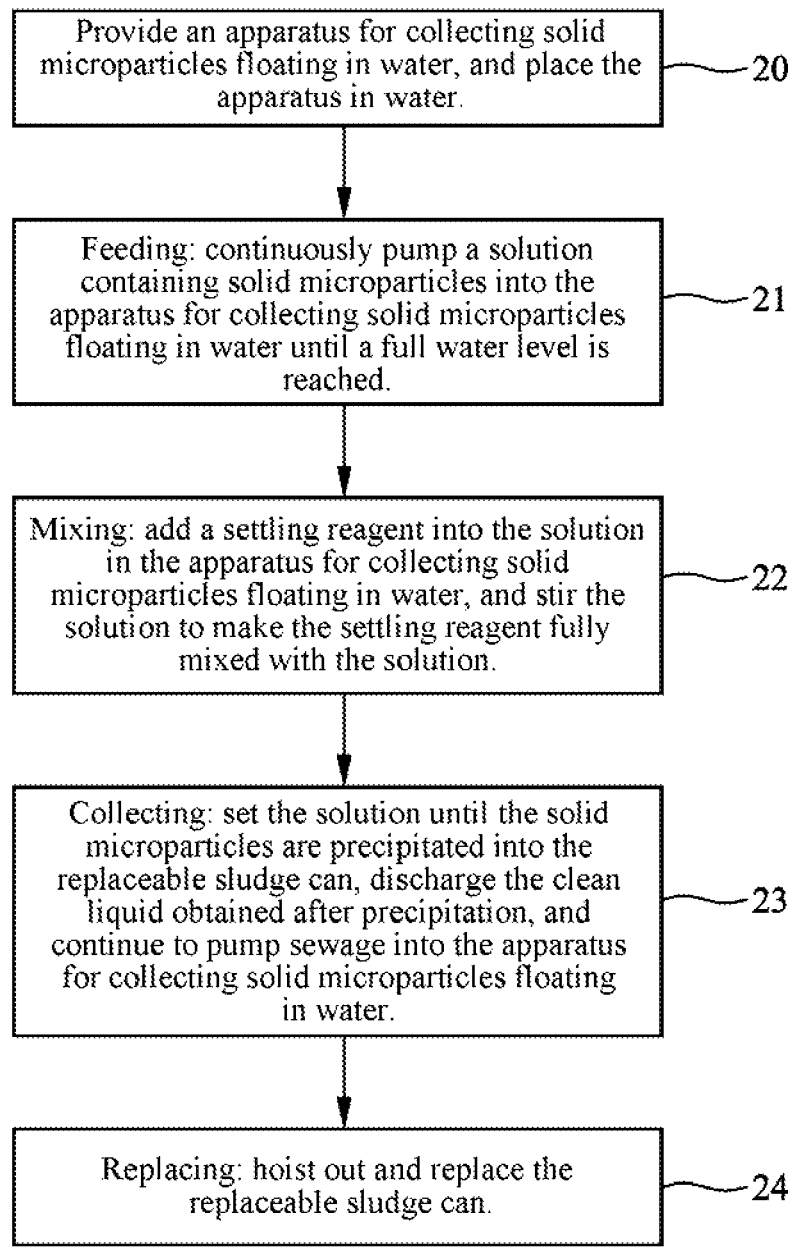
FIG. 2 is a flow chart of a method for collecting solid microparticles floating in water.

FIG. 2 is a flow chart of a method for collecting solid microparticles floating in water. Referring to FIGS. 1 and 2, the method includes the following steps.

Step 20 is performed first: an apparatus 1 for collecting solid microparticles floating in water is provided, and the apparatus is placed in water.

After Step 20, Step 21 is performed, which is a feeding step: a solution containing solid microparticles is continuously pumped into the apparatus 1 for collecting solid microparticles floating in water until a full water level is reached.

After Step 21, Step 22 is performed, which is a mixing step: a settling reagent is added into the solution in the apparatus 1 for collecting solid microparticles floating in water, and the solution is stirred to make the settling reagent fully mixed with the solution.

After Step 22, Step 23 is performed, which is a collecting step: the solution is set until the solid microparticles are precipitated into the replaceable sludge can 14, and the liquid obtained after precipitation is discharged, and sewage is continued to be pumped into the apparatus 1 for collecting solid microparticles floating in water.

Finally, Step 24 is performed, which is a replacing step: the replaceable sludge can 14 is hoisted out and replaced.

In Step 21, the solution containing solid microparticles is continuously pumped into the apparatus 1 for collecting solid microparticles floating in water even after the full water level is reached. In Step 23, the pumping of the solution and the discharging of the liquid are controlled to optimum rates. In Step 24, the pumping of the solution containing solid microparticles is paused, and the replaceable sludge can 14 is hoisted out and replaced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for collecting solid microparticles from water, comprising:
    (A) providing a floating container including an inverted conical floor with a central opening;
    (B) inserting at least one precipitation plate with a plurality of downward-sloping fins into said floating container, wherein said plurality of downward-sloping fins direct solid microparticles downward;
    (C) inserting a replaceable sludge can through the top of said floating container and into said central opening, wherein said replaceable sludge can seals said central opening;
    (D) filling said floating container with a solution containing solid microparticles;
    (E) adding a settling reagent into said solution containing solid microparticles;
    (F) stirring said solution until fully mixed with said settling reagent;
    (G) allowing said solid microparticles to precipitate into said replaceable sludge can;
    (H) discharging said solution containing solid micro-particles after precipitation of said solid microparticles;
    (I) repeating steps (D) to (H) until said replaceable sludge can is full; and
    (J) removing said replaceable sludge can.

2. The method for collecting solid microparticles from water according to claim 1, further comprising:
    providing a hoisting ring disposed on said replaceable sludge can, and a hoisting sling tied to said hoisting ring; and
    removing said replaceable sludge can via said hoisting sling in step (J).

3. The method for collecting solid microparticles from water according to claim 1, wherein the solution containing solid microparticles is continuously pumped into said floating container.

4. The method for collecting solid microparticles from water according to claim 3, wherein steps (D), (G), and (H) are controlled to optimum rates.

5. The method for collecting solid microparticles from water according to claim 4, wherein the pumping of the solution containing solid microparticles is paused during step (J).

* * * * *